United States Patent [19]

Bacardit et al.

[11] Patent Number: 4,550,566
[45] Date of Patent: Nov. 5, 1985

[54] BRAKE MASTER CYLINDER

[75] Inventors: Juan S. Bacardit; Juan V. Coll; Joaquim F. Bofill, all of Barcelona, Spain

[73] Assignee: Bendiberica, S.A., Barcelona, Spain

[21] Appl. No.: 586,644

[22] Filed: Mar. 7, 1984

Related U.S. Application Data

[62] Division of Ser. No. 283,391, Jul. 15, 1981, abandoned.

[30] Foreign Application Priority Data

Jul. 30, 1980 [ES] Spain .................................. 494.695

[51] Int. Cl.⁴ ............................................ B60T 13/20
[52] U.S. Cl. ........................................ 60/554; 60/562; 91/369 A
[58] Field of Search ............... 60/547.1, 551, 552, 60/553, 554, 562; 92/107, 369 A

[56] References Cited

U.S. PATENT DOCUMENTS

| 2,603,066 | 7/1952 | Rockwell. | |
|---|---|---|---|
| 2,900,962 | 8/1959 | Ingres | 60/547.1 |
| 2,929,215 | 3/1960 | Stelzer | 60/547.1 |
| 2,929,216 | 3/1960 | Stelzer | 60/553 |
| 2,957,454 | 10/1960 | Stelzer | 60/551 |
| 3,172,265 | 3/1965 | Randol. | |
| 3,222,869 | 12/1965 | Rockwell | 60/554 |
| 3,408,815 | 11/1968 | Stelzer | 60/553 |
| 3,564,849 | 2/1971 | Huruta | 60/553 |
| 3,851,473 | 12/1974 | Bainbridge | 60/552 |
| 4,365,538 | 12/1982 | Andoh | 92/107 |
| 4,417,445 | 11/1983 | Furuta | 91/369 A |

FOREIGN PATENT DOCUMENTS

| 1131534 | 6/1962 | Fed. Rep. of Germany. | |
|---|---|---|---|
| 2361258 | 3/1978 | France. | |
| 4422133 | 9/1969 | Japan | 60/547.1 |
| 2070172 | 9/1981 | United Kingdom | 60/547.1 |
| 2073345 | 10/1981 | United Kingdom | 60/547.1 |
| 2074268 | 10/1981 | United Kingdom | 60/547.1 |

Primary Examiner—Abraham Hershkovitz
Attorney, Agent, or Firm—Larry J. Palguta; Ken C. Decker

[57] ABSTRACT

A brake-master cylinder provided to be actuated either by exerting thrust at one end or pulling at the other end and therefore comprising a push member for actuating the primary piston and an assisting rod intended to be pulled and protruding outwardly from one end of the master-cylinder, said piston being fitted to the assisting rod.

9 Claims, 6 Drawing Figures

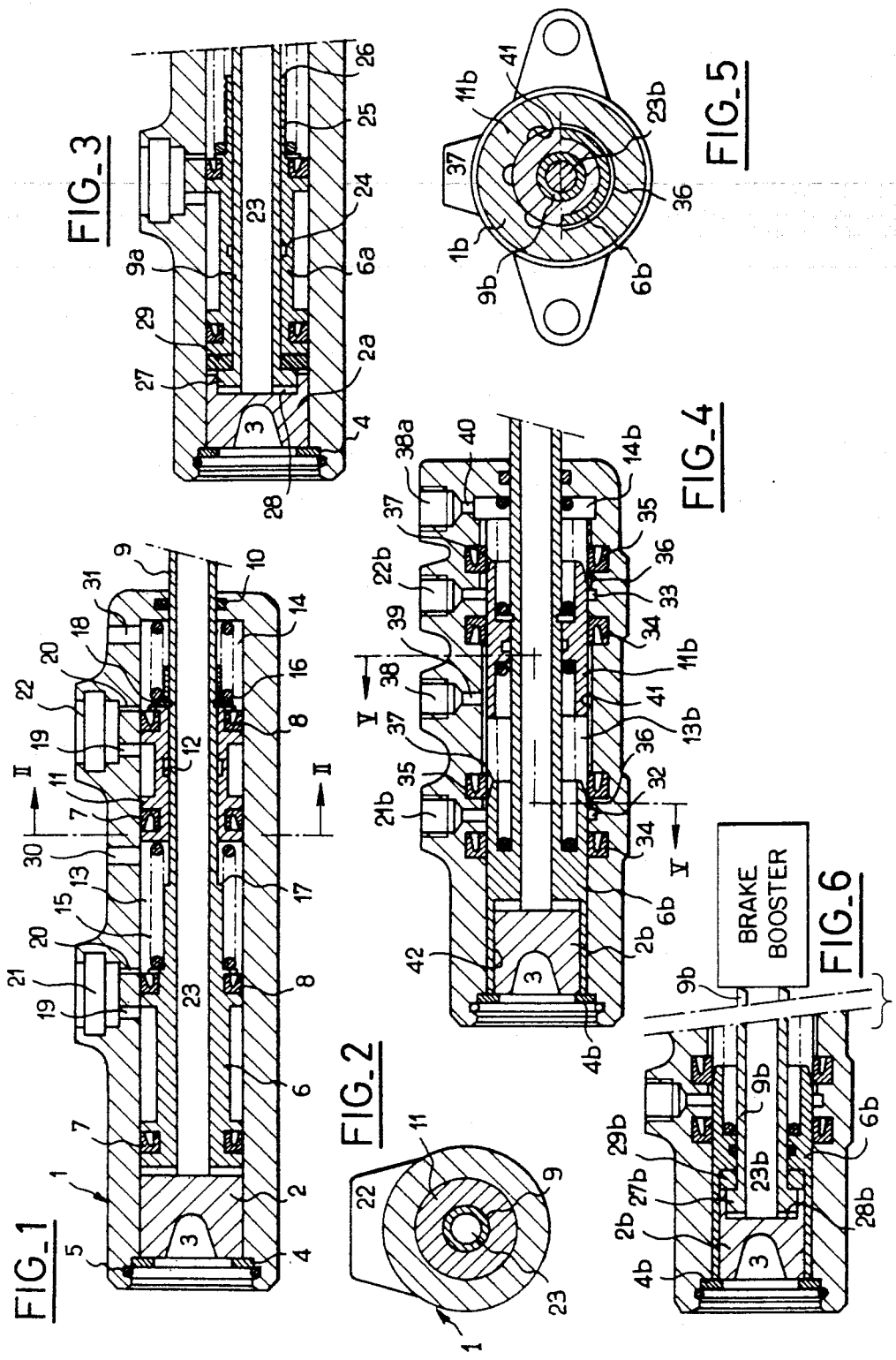

BRAKE MASTER CYLINDER

This is a divisional of co-pending application Ser. No. 283,391, filed July 15, 1981, now abandoned.

The invention concerns a brake master-cylinder and more particularly an improvement thereof to control the piston stroke by means of either a pulling or a pushing effort.

A master-cylinder is known for a hydraulic brake, which comprises a cylindrical housing within which slide one or two pistons defining the respective pressure enclosures for two brake circuits, each one connected to a hydraulic fluid reservoir and to the corresponding circuit, with the piston or pistons connected to the brake actuation element and to an assisting device.

Usually, the master-cylinder, the assisting device, a control valve and an actuation pedal coupling device all form a compact servo-brake unit for an automobile.

However, because of lack of space, and for other constructional reasons, it is sometimes necessary to install the assisting device away from the master-cylinder and, to this end, assisting units also exist which include the corresponding control valve and which can receive an appropriate master-cylinder.

This invention provides a new solution to this problem and, to this end it concerns a brake master-cylinder comprising a cylindrical housing in which slide one or more pistons defining the respective pressure enclosures for two brake circuits, each one of which is connected to a hydraulic fluid reservoir and to the corresponding circuit, the piston or pistons being connected to a brake actuation element characterized by the fact that the piston, or at least the primary piston of the master-cylinder, is thrust by the end receiving body forming a push member of the brake actuation element, that it is fitted to an assisting rod which runs the entire length of the cylinder and protrudes through the opposite end of the latter for connection to a pulling means, so that the master-cylinder in question can be actuated either by exerting thrust on the end receiving body, or by exerting traction on the rod.

To this end, the assisting rod may be fastened, or be in one piece with the piston or the primary piston of the master-cylinder, and it may be equipped with a step, downstream of the primary piston, said step constituting a stop for the secondary piston in relation to the rod. Further, the assisting rod may be hollow and be an axial guide for a rod actuating a control valve located on an assisting device, this assisting rod being capable of being actuated by the end receiving body, as a push member, of the brake actuation element.

According to another feature of this invention, the piston seals are fastened into annular grooves of the cylinder interior wall, and the pistons have smooth lateral surfaces which adjust hermetically to the seals in question. More specifically, the cylinder comprises a seal upstream and another one downstream (in relation to the piston actuation direction), of the orifice for the communication of each brake enclosure with the corresponding feed reservoir, while the base or the thrust surface of each piston is bevelled or provided with grooves so that, in idle position of said pistons, it provides communication between the brake enclosures and the feed orifices respectively.

If required, the cylinder can be equipped with an elastic reaction device between the actuation end of the assisting rod and the adjacent end of the piston or primary piston.

The attached drawings show examples of this invention.

FIG. 1 shows an axial cross-section of a master cylinder with the improvements of the invention.

FIG. 2 shows a cross-section along the line II—II line of FIG. 1.

FIG. 3 shows an axial cross-section of the actuation end of a master-cylinder similar to those of the previous figures, equipped with a traditional elastic reaction device.

FIG. 4 shows an axial cross-section of a master-cylinder in an alternative of the invention.

FIG. 5 shows a transversal cross-section along line V—V of FIG. 4, and

FIG. 6 shows a partial axial cross-section of a master-cylinder similar to that shown on FIG. 4, but equipped with an elastic reaction device.

FIGS. 1 and 2 show a master-cylinder (1), closed at one end and, at the other end, equipped with a sliding push member (2) which is in turn equipped with a ball-joint seat (3) to which can be applied the complementary end, as is usual, of the actuation rod from the brake pedal (not shown). This push member (2) is secured by a washer (4) which is in turn secured by a small elastic ring (5).

A primary piston (6) slides inside the bore of the cylinder (1) and adjusts hermetically by means of two seals (7 and 8), and it extends in the advance direction forming a rod (9) which protrudes from the cylinder through an orifice formed in the bottom of said cylinder and equipped with a sealing gasket (10).

A secondary piston (11) is adjusted to slide on the rod (9), and is equipped with seals similar to those of piston (6) (same references), and with an interior gasket (12) which adjusts to the surface area of the rod. In this way, two pressure enclosures are defined, the primary enclosure (13) and the secondary enclosure (14).

The primary piston (6) and the push member (2) are secured in idle position as shown by elastic means which are not illustrated, and the relative position of the pistons are maintained by two intermediate springs (15 and 16) located in enclosures 13 and 14. Also, the stroke of the secondary piston on rod (9) is limited by two stops formed by a step (17) of the latter and by a "cir-clip" (18) fitted in a groove on the rod.

Each enclosure (13 and 14) communicates through a main passage (19) and a compensation passage (20) with the corresponding unions (21 and 22) on which can be connected the tubes from feed reservoirs.

The rod (9) can be fastened in any manner required to a pulling means such as the mobile part of an assisting device, such as a brake booster shown schematically in FIG. 6, and, further, it is hollow and acts as a guide for an actuation rod (23) which can be connected to the mobile part of the corresponding valve and which bears against the end of the push member (2) to receive the corresponding actuation.

The cylinder described can be equipped with an elastic reaction device as shown in FIG. 3.

In FIG. 3, the primary piston (6a) is independent of the assisting rod (9a) and is formed of a tubular part which adjusts to slide hermetically on this assisting rod by means of a seal (24). The primary piston 6a forms a sleeve (25) of adequate length to form a stop (26) equivalent to the step (17) of the previous embodiment.

The assisting rod (9a) protrudes beyond the end of the primary piston actuation end and forms a flange (27) contained within a cavity (28) formed in the inner surface of the push member (2a). Between the flange and the piston is located an elastomeric washer (29) which forms a reaction device; as can be seen, the various parts are dimensioned so that the edge of the push member comes into contact with the elastomeric washer before the bottom of the push member 2a reaches the opposite surface of the flange. The assisting device control valve actuation rod (23) is the same as previously, and it bears against the bottom of the push member 2a.

In the design described, communication between the pressure enclosures (13 and 14) and the brake circuits occur normally, through, for instance, openings (30 and 31) shown on FIG. 1.

FIG. 4 shows an alternative master-cylinder which operates on the same principle as the one shown on FIG. 1, but which includes means making it possible to reach the length of cylinder, with the corresponding advantages for assembly.

As has been mentioned, the total length of a master-cylinder of this type is limited by the required length of the piston stroke, the piston length necessary for correct guiding, and the distance which must be allowed between the hydraulic fluid outlet openings so that they are not at any time closed by the pistons.

For this, the primary and secondary pistons (6b and 11b) have smooth cylindrical lateral surfaces and the hydraulic fluid inlets (21b and 22b) communicate with two annular grooves (32 and 33), formed on the interior surface of the cylinder.

Laterally to each groove is a pair of seals 34 and 35 set in respective annular recesses of the cylinder bore. Longitudinal grooves 36 extend between each annular groove and seal 35 of each pair (the seal closest to the corresponding pressure enclosure) and the operative ends of the pistons have several notches or chamfers (37) which, in idle position of the assembly is slightly separate from the rear edge of the seals (35), to form feed and compensator passages.

Further, the openings 38 and 38a for the respective brake circuits open into the enclosures (13b and 14b) through channels (39 & 40) which can be covered by either one of the pistons (as is the case for channel (39)) at certain moments during operation of the system. More specifically with regard to FIG. 4, channel (39) is covered by the secondary piston (11b). However, in each enclosure, the interior surface of the cylinder has a series of longitudinal grooves (41) which communicate with the channel opening (in this case 39), so that the required communication is ensured at all times, even though the stroke distances between the extreme edges of the piston and the outlet openings are disregarded.

The reduction in length obtained in this manner is obvious when FIGS. 1 and 4 are compared.

In the FIG. 4 embodiment, the primary piston (6b) is modified in that its actuation end bears in the idle position, directly against the stop washer (4b), and the push member (2b) is fitted inside a cavity (42) of the primary piston at the actuation end thereof.

FIG. 6 shows the application of an elastic reaction device embodiments of the FIGS. 4 and 5, in the same way as has been described for FIG. 3, thus eliminating the necessity for a detailed description. The corresponding parts have the same numerical references.

We claim:

1. A brake master cylinder to be coupled at one end to a brake booster, including a body formed with a longitudinal bore within which is movably received at least one annular master cylinder piston, an assisting pull rod to be actuated by said booster slidably extending through said piston and having an end portion opposite said one end of said master cylinder and formed with an outwardly radially extending flange member, an elastomeric annular reaction member arranged around said pull rod and interposed between said flange member and said piston, a push member slidingly arranged within the other end of said master cylinder adjacent said piston and connectable to a brake actuating member, said push member forming a cavity having a bottom facing said end portion of said pull rod and a peripheral edge, said flange member being received within said cavity, said peripheral edge and said flange member adapted for bearing engagement with said elastomeric annular reaction member, and said piston movable by both said pusher member and by said pulling rod via said elastomeric annular reaction member.

2. A brake master cylinder according to claim 1, wherein said push member is slidably mounted within an opening of a cylindrical extension of said piston extending in the direction opposite said one end of said master cylinder.

3. A brake master cylinder according to claim 1, wherein said assisting pull rod is tubular and houses a push rod connectable to said booster, said push rod having one end protruding outwardly from said tubular pull rod to cooperate in bearing engagement with said bottom of said cavity in said push member.

4. A brake master cylinder according to claim 1, further comprising a secondary master cylinder piston sealingly slidably mounted on said assisting pull rod intermediate said one annular master cylinder piston and said one end of said master cylinder, an outwardly extending stop means on said pull rod and a compression spring interposed between said pistons to normally bias said secondary piston in abutment against said stop means.

5. A brake master cylinder according to claim 4, including an inwardly radially extending abutment in said bore adjacent said other end of said master cylinder and forming a stop for both said cylindrical extension of said one piston and said push member.

6. A brake master cylinder according to claim 1, wherein said push member peripheral perimeter edge is disposed radially between said flange member and a cylindrical extension of said piston.

7. A brake master cylinder to be coupled at one end to a brake booster, including a body formed with a longitudinal bore within which is movably received at least one annular master cylinder piston, an assisting pull rod to be actuated by said booster and sealingly and slidably extending through said piston, the pull rod having an end portion opposite said one end of said master cylinder and formed with an outwardly radially extending flange member, an elastomeric annular reaction member disposed around said pull rod and interposed between said flange member and piston, a push member slidingly arranged within the other end of said master cylinder adjacent said piston and connectable to a brake actuating member, said push member forming a cavity having a bottom facing said end portion of said pull rod and an outer peripheral perimeter edge about said cavity, said flange member being received within said cavity so that the peripheral perimeter edge and said flange member may bear against said elastomeric annular reaction member such that said piston is displaced by both said push rod and pulling rod via said elastomeric annular reaction member, and said assisting pull rod being tubular and housing a push rod connectable to said booster, said push rod having one end protruding outwardly from the tubular pull rod to cooperate in bearing engagement with said bottom of said cavity in said push member.

8. A brake master cylinder according to claim 7, wherein said push member is slidably mounted within an opening of a cylindrical extension of said piston extending in the direction opposite said one end of said master cylinder.

9. A brake master cylinder according to claim 7, wherein said push member peripheral perimeter edge is disposed radially between said flange member and cylindrical extension of said piston.

* * * * *